(No Model.)  2 Sheets—Sheet 1.
G. AINGER.
COMBINED IRRIGATING AND BURNING MACHINE.
No. 533,577.  Patented Feb. 5, 1895.
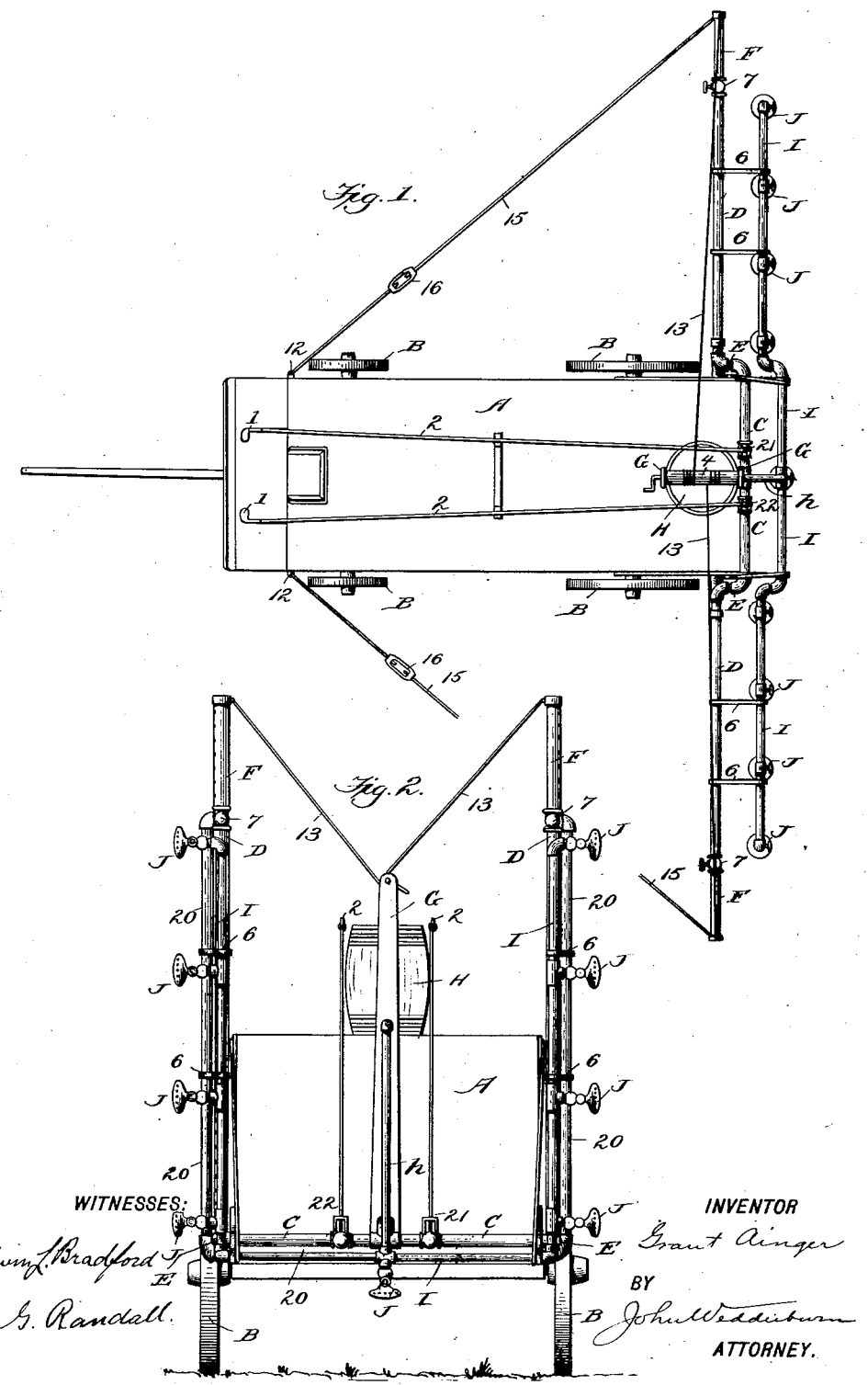
WITNESSES:
Edwin J. Bradford
L. G. Randall
INVENTOR
Grant Ainger
BY
John Wedderburn
ATTORNEY.

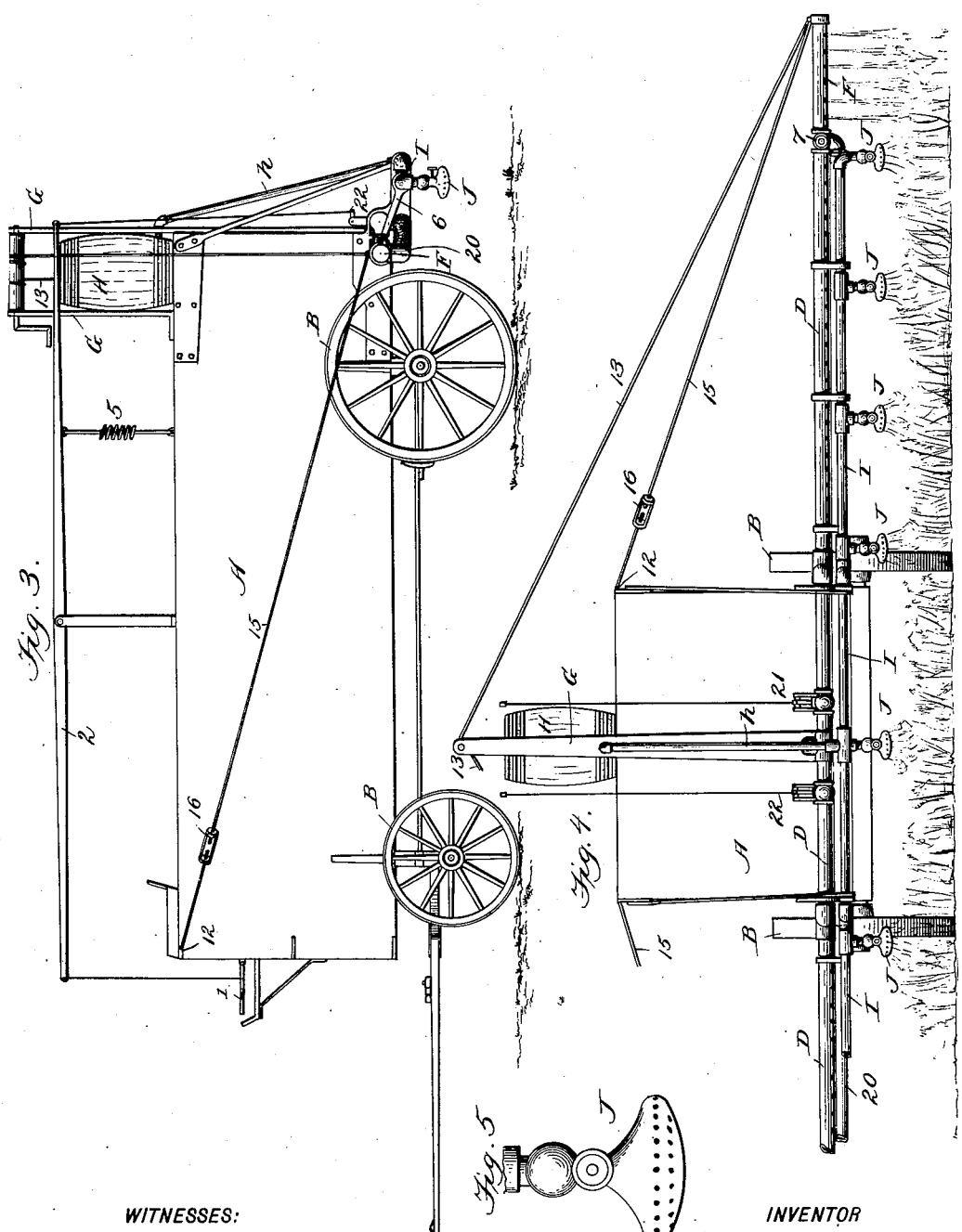

UNITED STATES PATENT OFFICE.

GRANT AINGER, OF NEW ENGLAND CITY, NORTH DAKOTA.

COMBINED IRRIGATING AND BURNING MACHINE.

SPECIFICATION forming part of Letters Patent No. 533,577, dated February 5, 1895.

Application filed October 30, 1894. Serial No. 527,459. (No model.)

*To all whom it may concern:*

Be it known that I, GRANT AINGER, a citizen of the United States, residing at New England City, in the county of Hettinger and State of North Dakota, have invented certain new and useful Improvements in a Combined Irrigating and Burning Machine; and I do hereby declare the following to be a full, clear, and exact description of the invention, such as will enable others skilled in the art to which it appertains to make and use the same.

This invention relates to an appliance or machine for clearing fields of weeds, grass and other foreign growths, and for its successful operation depends upon a combination of jets of fire and streams of water, the latter serving to prevent the spread of fire and retain the same within certain prescribed limits. The jets of fire or flame are designed to consume the growth and thus effectually destroy or obliterate the same, and obviate the usual accumulation of trash and grass resulting where the same is mowed.

The improvement consists essentially of a distributing pipe connected with a water tank and provided with outlet openings whereby the water is dispensed in fine streams to provide a margin or boundary line between which the flame jets are adapted to operate in the manner set forth; also, in the provision of a pipe provided with a series of burners the jets of which burn with sufficient force to prevent their being extinguished by an ordinary current of air or usual means.

The improvement further consists of the novel features and combination of the parts which hereinafter will be more fully described and claimed, and which are shown in the accompanying drawings, in which—

Figure 1 is a top plan view showing the application of the invention. Fig. 2 is a view showing the several pipes folded close to the sides of the tank. Fig. 3 is a side elevation showing the application of the invention. Fig. 4 is a rear elevation of the same, and Fig. 5 is a detail view of one of the burners.

Referring to the drawings, the letter A represents a tank of ordinary construction, such as provided for carrying a supply of water similar to the sprinkling devices for street purposes. This tank is mounted upon wheels B in any desired manner.

An approximately T-shaped pipe C located in the rear of the tank is connected by its middle branch to the tank so as to convey water therefrom to the horizontal bars of the said pipe C.

Lateral branches D are connected by a suitable joint E and with the ends of the T pipe C in such a manner as to permit of their being readily folded close against the sides of the tank when it is desired to transport the matter or travel in such places where the projecting branches D would be interfered with by obstructions.

The horizontal bars of the branch pipe C, as also the branches D, are provided with suitable outlets for the discharge of the water when it is desired to wet the ground throughout the entire length of the branches D and the horizontal bars of the branch C.

Valves provided with suitable operating stems 21 and 22, are located, one on each side of the central portion of the T-pipe C to regulate the supply of water to either the right or left hand extension of the distributing pipe. In the event of both valves being opened, the water will be spread the full length of the distributing pipe, thereby preventing the spread and extinguishing the fire caused by the burners.

Extension pipes F, about five feet in length, are provided at each end of the branch pipes D, and independent valves 7 are provided to regulate the supply of water thereto.

Beneath the main distributing pipe and parallel thereto, is located an auxiliary pipe 20 of substantially the same contour and form as the united parts comprising the main distributing pipe. The ends of this auxiliary distributing pipe are connected with the end extensions F and the flow of water is regulated therefrom to the said extensions F by means of the valves 7.

Suitable braces 15 extend from the ends of the extensions F to the front ends of the tank and are connected with the latter by detachable fastening, as shown at 12. These braces 15 have turn buckles 16 in their length by means of which the tension on the said braces can be properly adjusted.

A windlass 4 is journaled at its ends in standards G rising vertically from the tank and cords or cables 13 are attached at their inner ends to the windlass and are connected at their outer ends to the extension pipes F. By operating the windlass 4 the cords or cables 13 are wound up and the branch pipes D folded close against the sides of the tank, thereby reducing the width of the machine for purposes of transportation and to avoid obstructions.

Foot levers 1 are provided at the front end of the tank and are connected by rods 2 to the releasing valves whereby when it is desired to establish communication between the tank and the distributing pipes, one or both of the said levers may be pressed upon by the feet of the driver. Retracting springs 5 are provided to normally hold these valves closed. Hence, when pressure is removed from the levers 1 the valves automatically close by the action of the retracting springs 5 and shut off the flow of water to the distributing pipes.

The reservoir H for receiving and holding the inflammable or volatile oil is conveniently supported upon the tank, preferably between the standards G and has extending therefrom a pipe $h$ by means of which the oil is supplied to the burner pipe I located in the rear and approximately parallel with the water distributing pipes. This pipe I is located at a lower level than the water distributing pipes and its ends terminate in the plane of the ends of the branch pipes D. Hence, it will be seen that the extension pipes F project beyond the ends of the burner pipe I so as to water the ground on each side of the track or path covered by the said pipe I. Burners of suitable construction will be located at proper intervals in the length of the pipe I. These burners J will be of such construction and distribute the flame so that their united action will cover the entire space traversed by the pipe I. Each of the burners will be provided with a regulating valve so that the flame jets of each can be independently regulated and they will be so mounted with reference to the pipe I so as to yield when meeting with an obstruction. Suitable braces 6 will be provided to connect the pipes D and I and hold them in a fixed relative position.

In the operation of the machine or invention, the tank will be supplied with water and the reservoir H with a suitable inflammable oil. The device will be drawn over the field by suitable traction power or team of horses. While the device is in motion the burners will be ignited and the flame will consume the grass and other foreign growths within its reach. The jets of water from the end extensions F will provide the path of from five to six feet wide on each side of the track covered by the flame so as to prevent the spread of the fire with disastrous results. Should the flame from any reason get beyond the control the burners have the supply of oil shut off therefrom and the water is distributed throughout the entire length of the distributing pipe in such a manner as to extinguish the flames and prevent the spread of fire.

Having thus described the invention, what is claimed as new is—

1. The combination with a water tank, having horizontally disposed water distributing pipes, with extensions at each end thereof, of a pipe provided with a series of burners and located within the space comprised between the extensions, substantially as set forth.

2. In combination, a tank for receiving water, a distributing pipe having connection with the tank and provided at its ends with perforate extensions, an auxiliary distributing pipe having connection with the tank and its ends with the said perforated extensions, independent valves for controlling the supply of water from the auxiliary distributing pipe to the said perforated extensions, and a burner pipe located in the rear of the distributing pipes and terminating within the inner ends of the aforesaid perforated extensions, substantially as set forth.

3. In combination, a water tank, a distributing pipe connected therewith and adapted to have its end portions fold close against the sides of the tank, and a burner pipe connected with the said distributing pipe and adapted to have its end portions fold with the corresponding folding portions of the distributing pipe, substantially as set forth.

In testimony whereof I have signed this specification in the presence of two subscribing witnesses.

GRANT AINGER.

Witnesses:
L. M. P. GRISWOLD,
H. W. SMITH.